April 10, 1956 C. H. BEANE 2,741,099
APPARATUS FOR INDICATING AND CONTROLLING THE
TEMPERATURE OF PRODUCTS WITHIN
PREDETERMINED LIMITS
Filed Feb. 11, 1953 2 Sheets—Sheet 1
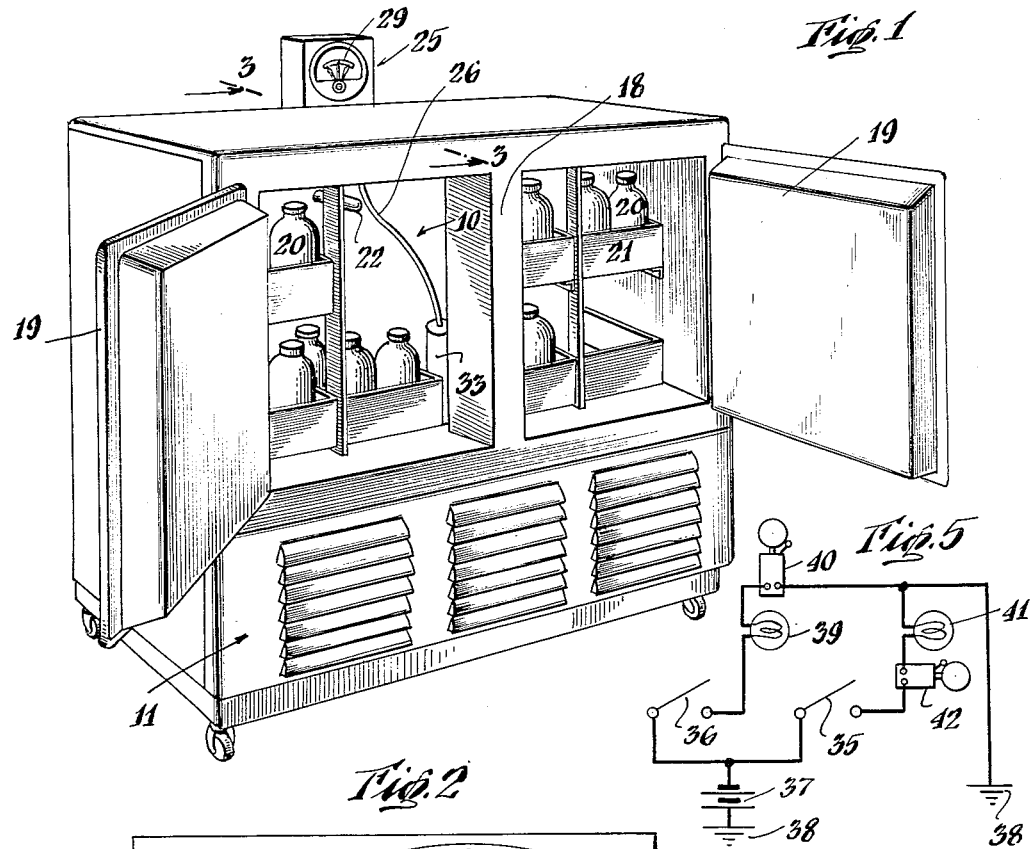
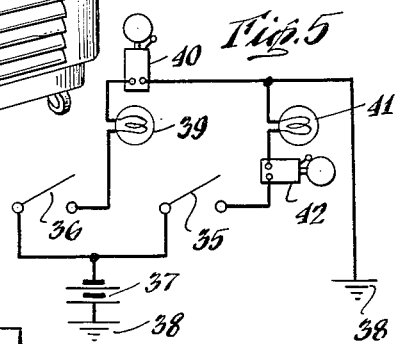
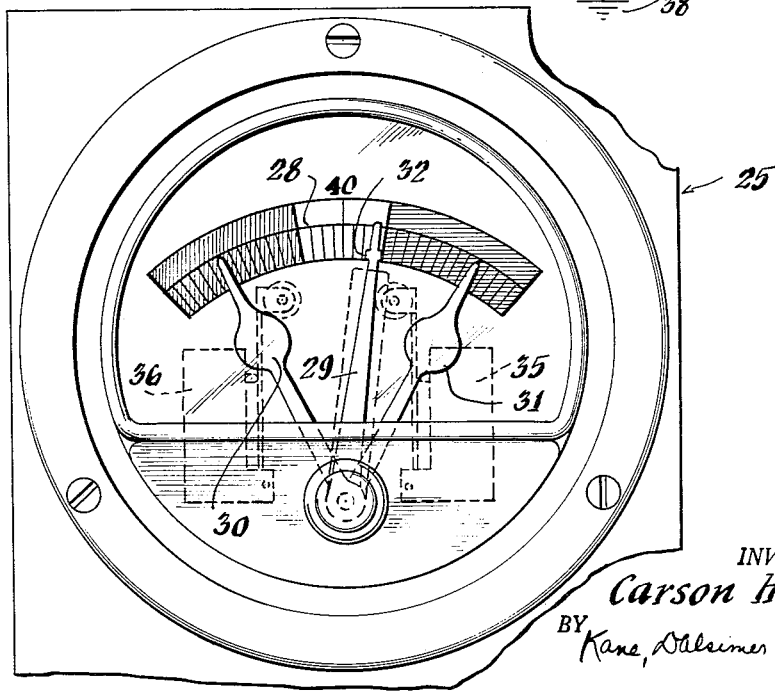
INVENTOR.
Carson H. Beane
BY Kane, Dalsimer and Kane
ATTORNEYS

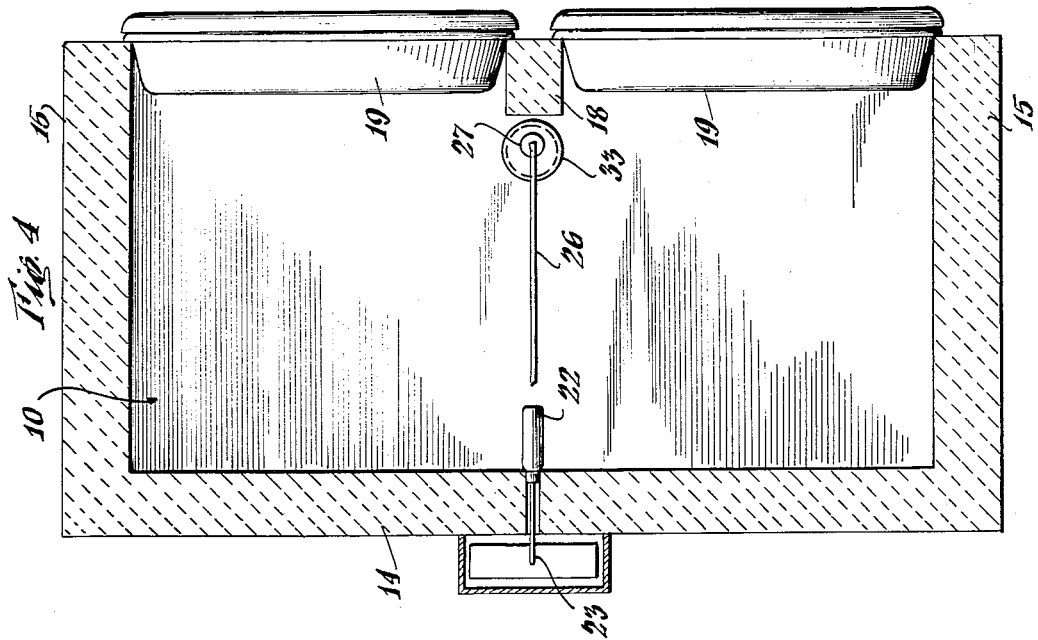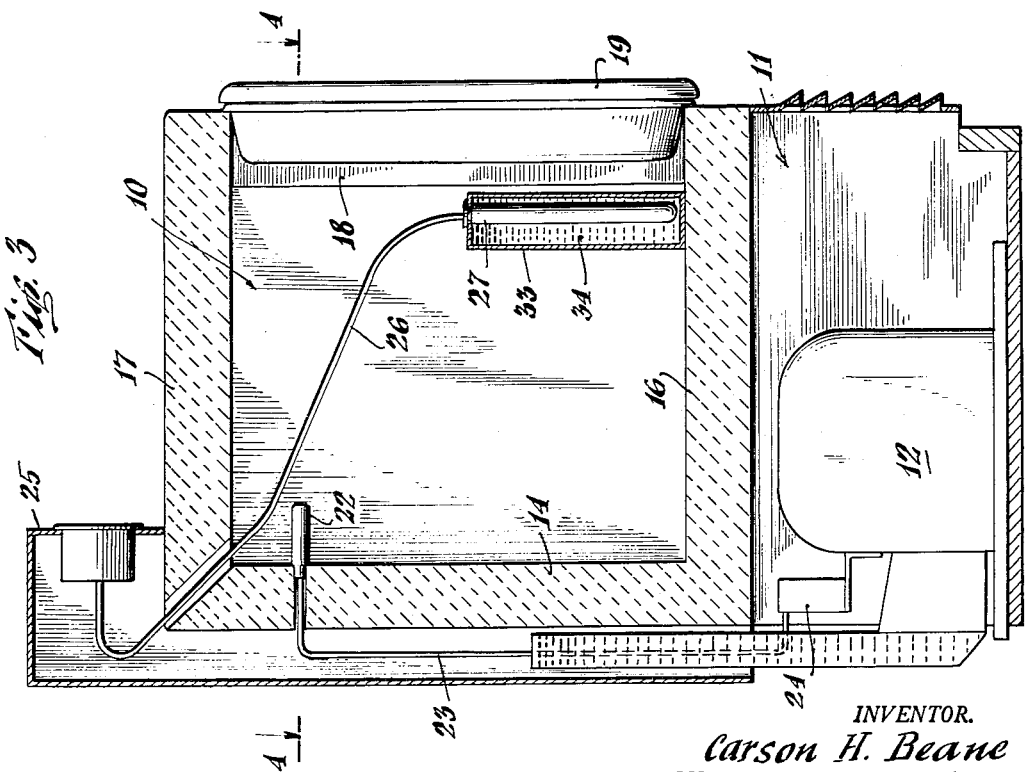

United States Patent Office 2,741,099
Patented Apr. 10, 1956

2,741,099

APPARATUS FOR INDICATING AND CONTROLLING THE TEMPERATURE OF PRODUCTS WITHIN PREDETERMINED LIMITS

Carson H. Beane, Binghamton, N. Y., assignor to The Brewer-Titchener Corporation, Cortland, N. Y., a corporation of New York Application February 11, 1953, Serial No. 336,362

9 Claims. (Cl. 62—6)

This invention relates to improved apparatus of the type which is useful in storing products and maintaining their temperature within predetermined limits.

The temperature of many products, such as biological fluids, must be controlled within predetermined limits while they are being stored. Thus, whole blood, while it is being stored, should be maintained between 37° and 44° F. Any substantial fluctuation beyond the predetermined range results in damage to the product so that it is no longer useful. Ordinary temperature indicators and thermometers which indicate the temperature of the air space in which the products are being stored do not accurately reflect the temperature of the products themselves since the thermal characteristics of the products will naturally be somewhat different from that of the air in which they are stored and the temperature of the products does not vary as rapidly as that of the air. On the other hand, I have found that temperature indicators accurately reflecting the temperature of the products themselves are not satisfactory since they will only indicate a dangerous temperature i. e. a temperature outside of the predetermined limits) after it is too late and after the damage to the product has already been done.

It is an object of the present invention to overcome the above indicated difficulties and disadvantages and to provide an improved thermometer and temperature indicating means which will anticipate changes in temperature of the product being stored so as to indicate the changes before they actually occur. This enables the operator to check and to control the apparatus and to prevent the dangerous condition from actually arising in the product being stored. Coupled with my improved thermometer, I provide improved indicating means for indicating the minimum and maximum temperatures reached by the product during any storage period.

I also contemplate the provision of a thermostatic control for the refrigerating apparatus which operates in response to the ambient temperature of the atmosphere or air in which the products are stored. For a fuller understanding of the invention, reference should be had to the drawings in which—

Fig. 1 is a perspective view of a refrigerated storage cabinet embodying my invention;

Fig. 2 is a partially fragmentary elevational view of a thermometer gauge or dial located on top of the refrigerator cabinet;

Fig. 3 is a vertical sectional view through the center of the cabinet in the direction of the arrows on the line 3—3 of Fig. 1;

Fig. 4 is a transverse sectional view in the direction of the arrows on the line 4—4 of Fig. 3; and Fig. 5 is a wiring diagram showing an arrangement which may be operated by the thermometer or temperature indicating means.

My invention is illustrated as applied to a refrigerated storage cabinet designed for the storage of whole blood for medical use i. e. blood transfusions and the like.

To be useful the blood must be stored between approximately 37° and 44° F. Since the temperature of the blood must thus be controlled between predetermined limits it will be appreciated that my invention has particular application in connection with apparatus for storing whole blood. It should also be understood, however, that my invention may also be used wherever it is desired to control the temperature of products within predetermined limits.

Referring to Figs. 1, 3 and 4 it will be seen that my improved cabinet has an upper storage section 10 in which the blood or other products are stored and a lower base section 11 for housing the compressor or refrigerating unit 12. The storage compartment is provided with suitable heat-insulated back, side, bottom and top walls indicated at 14, 15, 16 and 17. The front of the storage compartment is provided with a pair of openings separated by vertical stile 18 and a pair of hinged doors 19 are adapted to close the openings in the usual manner. The doors 19 are insulated in the same manner as the walls of the storage compartment.

The whole blood is conveniently stored in separate, individual bottles of uniform size as shown at 20 in Fig. 1 and suitable provision is made in the compartment for holding these bottles. One suitable arrangement is to provide a plurality of sliding drawers 21 of a size to hold the desired number of bottles. Under this arrangement the drawer may be partially withdrawn from the storage compartment and the bottle or bottles can then be conveniently inserted or removed therefrom.

As previously stated, the temperature of the blood should be maintained between 37° and 44° F. preferably in the area of 40° to 41° F. The temperature is maintained within the predetermined range by means of conventional refrigeration apparatus in the usual manner and the particular form of the compressor and evaporator and their relationship to the compartment 10 forms no part of my present invention. While the complete refrigerating apparatus is not shown I have indicated a compressor unit 12 whose operation is controlled by thermostat or thermo bulb 22 connected by capillary tube 23 to switch 24. The thermo bulb 22 is positioned directly in the air space of the storage cabinet and accordingly the operation of the compressor is controlled through the ambient temperature of the atmosphere in which the blood is stored.

The controls should be set so that the temperature of the air space is maintained as close as possible to the optimum temperature of 40° to 41° F. Under those circumstances, blood placed in the storage compartment will be brought to the proper temperature and maintained within the desired predetermined range so long as the automatic controls and the refrigerating apparatus operate in a satisfactory manner.

It is important to provide indications or warnings of a visual or audible character which will serve as an auxiliary check or control in the event that the automatic controls or the refrigerating apparatus do not function properly. This apparatus may take the form of a thermometer or temperature indicating device 25 controlled through capillary tube 26 by thermo bulb 27. The thermometer may be of any desired type but is preferably of the minimum-maximum type which will indicate the minimum and maximum temperatures incurred during any given storage period as well as the current temperature. Such thermometers are well-known and are commercially available. One such thermometer commercially available through the Electric Auto-Lite Company of La Crosse, Wisconsin, is shown in Figs. 1 and 2 of the drawings. The specific manner in which the thermometer operates forms no part of this invention but it operates in the usual manner in response to the expansion and contraction of the fluid in the thermo bulb 27 which, it will be recalled, is connected by capillary 26 to the thermometer.

The thermometer is provided with a dial face 28 containing graduations representing Fahrenheit temperature degrees and extending above and below the indicated range of 37° to 44° F. but preferably emphasizing the indicated range in its markings. The thermometer also has three pointers or hands 29, 30 and 31. The pointer 29 is the operative pointer operating in response to the temperature at the thermo bulb. The hands 30 and 31 are idler hands indicating the minimum and maximum temperatures respectively encountered during any storage period. The idler hands are manually controlled by suitable mechanism (not shown) so that they can normally be manually shifted to any desired position. At the beginning of the storage period they are placed in substantial registration with the operating pointer 29. When pointer 29 moves to the left, as viewed in Fig. 2, it engages and shifts pointer 30 to the left with it. When it shifts to the right it engages and shifts pointer 31 with it. This is due to the outward projection 32 on pointer 29 which projects into the path of movement of the two idler pointers. The pointers 30 and 31 are so mounted that when shifted outwardly by pointer 29 they will remain in their shifted positions until they are shifted further outwardly or until they are manually reset.

It will thus be appreciated that the operator can observe the current temperature of the blood by observing pointer 29 and can also ascertain the lowest and the highest temperatures reached by the blood during the storage period by observing the positions of pointers 30 and 31. Through this medium it can be readily determined whether any damage has been sustained by the blood by temperature fluctuations outside the permissible range.

As I have previously indicated, the thermo bulb 27 should not be located in the air space of the storage cabinet so as to operate in response to the ambient temperature since this would not accurately reflect the temperature of the blood itself. Every fluctuation in temperature in the air caused by opening the doors, etc., is naturally not reflected by equal fluctuations in the temperature of the blood. On the other hand, I have also found that positioning the thermo bulb in one of the actual containers of blood is not satisfactory since it only indicates dangerous conditions outside of the desired temperature range after the damage has already been done.

I have found that the best results are obtained by immersing the thermo bulb in a control container 33 having slightly less thermal inertia than the containers of whole blood being stored in the unit. By this I mean that the mass of the container and its contents should be slightly less than the mass of the container of blood in each storage unit or the liquid or container in the control unit should be of greater conductivity than in the blood units or a combination of all of these factors. In this manner temperature changes in the control unit will "anticipate" temperature changes in the blood in the storage units i. e., the temperatures of the control unit will change slightly more rapidly than the temperature of the blood in the storage units.

The illustrated control unit 33 is in the form of a small metal tank filled with an aqueous solution of glycerine as shown at 34. It is positioned, as shown, in the storage compartment so as to be subject to all of the same thermal influences as the containers of blood. By locating it behind stile 18, it is out of the way and physically protected from damage. The thermo bulb 27 is closed and sealed inside the tank 33 in contact with the liquid. The tank 33 being made of metal has greater thermal conductivity than the bottles 20 in which the blood is stored. In addition, the quantity of liquid contained in the control unit 33 is slightly less than the amount of blood contained in the bottles 20. The glycerine and water have substantially the same thermal characteristics as whole blood. Thus, the thermal inertia of the control unit is less than that of the blood storage bottles and the temperature of the control unit will fluctuate slightly more rapidly than the temperature of the blood in the storage bottles. The thermometer 25 will accordingly indicate any dangerous fluctuations in temperature and give warning of any departure from the permissible range before it actually occurs in the blood being stored.

If desired, the thermometer may be provided with a warning signal which will operate when a dangerous condition is indicated. Thus, as shown in Fig. 2 a pair of micro-switches 35—36 may be provided on opposite sides of the pointer 29 in the path of movement thereof so as to be operated when the permissible limits of the temperature range are reached. As soon as the thermometer indicates that the control unit has reached a dangerous temperature the switch is operated which, in turn, causes the operation of a warning signal. The operator may then immediately check and take the necessary steps to prevent the temperature of the blood from likewise reaching this dangerous condition. The time lag in temperature changes of the blood as compared with temperature changes in the control unit resulting from the difference in thermal inertia permits this correction to be made before the blood is damaged.

In Fig. 5 I have indicated diagrammatically a circuit for a warning signal in which it will be seen that one side of each of the switches 35 and 36 are connected to one side of a source of electric current such as battery 37, the other side of which is grounded at 38. Switch 36 is also connected in series with light 39 and bell 40 so that when switch 36 is closed both a visible signal in the form of light 39, and an audible signal in the form of bell 40 is given. Switch 35 may be connected in series with the same signals or as shown with an additional light 41 and bell 42 so that the closing of switch 35 similarly causes both an audible and visual signal.

In the normal operation of my blood storage unit the blood is placed in the standard-sized bottles or containers in the drawers 21 inside the storage compartment and with the thermostatic control properly set the temperature of the blood will ordinarily be maintained at approximately 40° to 41° F. The current temperature of the control unit 33 which approximates that of the blood is shown by the pointer 29 of the thermometer while the minimum and maximum temperatures obtained during any storage period are shown by the pointers 30 and 31. Should any dangerous fluctuations in temperature occur these will be reflected in the temperature of the control unit before they will be in the blood storage units due to the lower thermal inertia of the control unit. These dangerous fluctuations will not only be reflected by the idler hands actuated by operating hand 29 but will also be duly indicated by the warning signal so that the operator is given ample warning to correct the situation before the blood is damaged.

It will thus be seen that I have provided storage apparatus having improved temperature indicating means which will anticipate fluctuations in temperature of the product being stored so as to give warning of any dangerous fluctuations before they actually occur. I have also provided improved apparatus whereby the control of temperature of the products being stored is facilitated. Modifications may be made in the illustrated and described embodiment without departing from the invention as set forth in the accompanying claims.

I claim:

1. Apparatus for storing products in containers and for maintaining them within a predetermined temperature range comprising: means providing a storage compartment for receiving and storing the containers of the product; heat control means for maintaining the temperature of the compartment within the predetermined range; a control container and contents presenting a mass of less thermal inertia than the containers of the product being stored positioned in the storage compartment; a thermometer; and means connecting the thermometer to the inside of the control container so as to cause the thermometer to operate in response to changes in temperature of the contents of the control container.

2. Apparatus for storing products in containers and for maintaining them within a predetermined temperature range as set forth in claim 1 in which a warning system is connected to the thermometer so as to operate when the temperature varies outside the predetermined temperature range.

3. Apparatus for storing products in containers and for maintaining them within a predetermined temperature range as set forth in claim 1 in which the thermometer has an operating pointer indicating the present temperature of the contents of the control container and two idler pointers positioned on opposite sides and in the path of movement of the operating pointer for indicating the minimum and maximum temperatures reached during an operating period.

4. Apparatus for storing products in containers and for maintaining them within a predetermined temperature range comprising: means providing a storage compartment for receiving and storing the containers of the product; heat control apparatus for maintaining the temperature of the compartment within the desired predetermined temperature range; thermostatic means for controlling the operation of the heat control apparatus positioned in the storage compartment so as to operate in response to changes in the ambient temperature of the atmosphere; a control container of contents having similar thermal characteristics to the products being stored but presenting a mass of less thermal inertia than the containers of the product being stored positioned in the storage compartment; a thermometer; and means connecting the thermometer to the inside of the control container so as to cause the thermometer to operate in response to changes in temperature of the contents of the control container.

5. Apparatus for storing whole blood in containers of uniform size and for maintaining the blood within a predetermined temperature range comprising: means providing a storage compartment for receiving and storing the containers of blood; a control container of a fluid presenting a mass of slightly less thermal inertia than the containers of blood, said control container being positioned in the storage compartment; a thermometer; and means connecting the thermometer to the inside of the control container so that the thermometer operates in response to changes in the temperature of the contents thereof.

6. Apparatus for storing whole blood in containers of uniform size and for maintaining them within a predetermined temperature range comprising: means providing a storage compartment for receiving and storing the containers of blood; refrigerating apparatus for maintaining the temperature of the compartment within the predetermined range; thermostatic means for controlling the operation of the refrigerating apparatus positioned in the storage compartment so as to operate in response to changes in the ambient temperature of the atmosphere thereof; a control container of a fluid having similar thermal characteristics to whole blood positioned in the storage compartment, said container being made of a material having greater heat conductivity than the containers for the blood and the mass of fluid contents being less than that of the blood in the containers whereby the temperature of the control container varies more rapidly than the temperature of the containers of blood; a thermometer; and means connecting the thermometer to the inside of the control container so as to cause it to operate in response to changes in temperature of the contents of the control container.

7. Apparatus for storing whole blood in containers of uniform size and for maintaining them within a predetermined temperature range comprising: means providing a storage compartment for receiving and storing the containers of blood; refrigerating apparatus for maintaining the temperature of the compartment within the predetermined range; thermostatic means for controlling the operation of the refrigerating apparatus positioned in the storage compartment so as to operate in response to changes in the ambient temperature of the atmosphere thereof; a control container and contents presenting a mass of less thermal inertia than the containers of blood being stored positioned in the storage compartment; a thermometer; and means connecting the thermometer to the inside of the control container so as to cause it to operate in response to changes in temperature of the contents of the control container.

8. Apparatus for storing whole blood in containers of uniform size and for maintaining them within a predetermined temperature range as set forth in claim 7 in which a warning system is connected to the thermometer so as to operate when the temperature varies outside of the predetermined temperature range.

9. Apparatus for storing whole blood in containers of uniform size and for maintaining them within a predetermined temperature range as set forth in claim 7 in which the thermometer has an operating pointer indicating the present temperature of the contents of the control container and two idler pointers positioned on opposite sides and in the path of movement of the operating pointer for indicating the minimum and maximum temperatures reached during an operating period.

References Cited in the file of this patent

UNITED STATES PATENTS

| | | |
|---|---|---|
| 1,421,517 | Malcamp | July 4, 1922 |
| 1,828,628 | Torgerson | Oct. 20, 1931 |
| 2,026,079 | White | Dec. 31, 1935 |
| 2,190,428 | Johnson | Feb. 13, 1940 |
| 2,585,086 | Brunsing | Feb. 12, 1952 |